(12) United States Patent
Liu et al.

(10) Patent No.: US 11,731,635 B2
(45) Date of Patent: Aug. 22, 2023

(54) PREDICTING DRIVER STATUS USING GLANCE BEHAVIOR

(71) Applicant: GM Global Technology Operations LLC, Detroit, MI (US)

(72) Inventors: Ke Liu, Lexington, MA (US); Ron Hecht, Raanana (IL); Noa Garnett, Herzliya (IL); Yi Guo Glaser, West Bloomfield, MI (US); Omer Tsimhoni, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 80 days.

(21) Appl. No.: 17/556,013

(22) Filed: Dec. 20, 2021

(65) Prior Publication Data
US 2023/0192095 A1     Jun. 22, 2023

(51) Int. Cl.
*B60W 40/08* (2012.01)
*G06F 3/01* (2006.01)
*B60W 60/00* (2020.01)
*G06V 20/59* (2022.01)
*B60W 50/14* (2020.01)
*B60W 50/00* (2006.01)

(52) U.S. Cl.
CPC .......... *B60W 40/08* (2013.01); *B60W 50/14* (2013.01); *B60W 60/0013* (2020.02); *B60W 60/0059* (2020.02); *G06F 3/013* (2013.01); *G06V 20/597* (2022.01); *B60W 2040/0818* (2013.01); *B60W 2050/009* (2013.01); *B60W 2540/225* (2020.02); *B60W 2540/229* (2020.02)

(58) Field of Classification Search
CPC .. B60W 40/08; B60W 50/14; B60W 60/0013; B60W 60/0059; B60W 2040/0818; B60W 2050/009; B60W 2540/225; B60W 2540/229; G06F 3/013; G06V 20/597
See application file for complete search history.

(56) References Cited

U.S. PATENT DOCUMENTS

| 2014/0139655 | A1* | 5/2014 | Mimar | G08B 21/0476 340/575 |
| 2022/0144307 | A1* | 5/2022 | Jung | B60W 50/16 |
| 2022/0204035 | A1* | 6/2022 | MacKenzie | B60W 60/0059 |

* cited by examiner

*Primary Examiner* — Thomas S McCormack
(74) *Attorney, Agent, or Firm* — Vivacqua Crane PLLC

(57) ABSTRACT

A method of monitoring a driver in an autonomous vehicle includes monitoring, with a driver monitoring system, a driver of a vehicle, collecting, with a data processor, data from the driver monitoring system related to gaze behavior of the driver, classifying, with the data processor, the driver as one of a plurality of driver statuses based on the data from the driver monitoring system, and sending, with the data processor, instructions to at least one vehicle system based on the classification of the driver.

20 Claims, 3 Drawing Sheets

PREDICTING DRIVER STATUS USING GLANCE BEHAVIOR

INTRODUCTION

The present disclosure relates to a system for predicting a status of a driver of a vehicle based on glance behavior of the driver. Driver-monitoring systems typically use a driver-facing camera equipped with infrared light-emitting diodes (LEDs) or lasers so that it can "see" the driver's face, even at night, and see the driver's eyes even if the driver is wearing dark sunglasses. Advanced on-board software collects data points from the driver and creates an initial baseline of what the driver's normal, attentive state looks like. The software can then determine whether the driver is blinking more than usual, whether the eyes are narrowing or closing, and whether the head is tilting at an odd angle. It can also determine whether the driver is looking at the road ahead, and whether the driver is actually paying attention or just absent-mindedly staring.

If the system determines that the driver is distracted or drowsy, it could get the driver's attention by issuing audio alerts, lighting up a visual indicator on the dashboard or vibrating the seat. If the interior sensors indicate that the driver is distracted while the vehicle's external sensors determine it is about to have a collision, the system could automatically apply the brakes, using information from interior and exterior sensor fusion.

In an autonomous vehicle, one goal of a vehicle control module is to minimize the number of driver take-over events. A driver take-over event is anytime that a driver within an autonomous vehicle takes over manual control of the vehicle when the vehicle is operating in autonomous mode. A take-over event may occur when the driver of the vehicle simply decides to take over manual control. A take-over event may also occur when, during autonomous operation of the vehicle, a driver of the vehicle becomes uncomfortable and feels the need to take over manual control of the vehicle. This may be due to the vehicle following a vehicle immediately in front too closely, or the vehicle may be traveling at a rate of speed that the driver feels is too fast given the current weather conditions.

The way the vehicle control module controls the vehicle is dictated based on a behavior model which tells the vehicle control module how to control the vehicle during various situations and conditions. Since every individual driver will have different preferences, it is impossible for a behavior model to match the preferences of every possible driver.

Thus, while current driver monitoring systems achieve their intended purpose, there is a need for a new and improved system and method for predicting discomfort of a driver/passenger within an autonomous vehicle based on glance behavior observed by a driver monitoring system, to allow a vehicle control module to alter the driving behavior of the vehicle, thus reducing the number of take-over events based on discomfort of the driver. Further, there is a need for a new and improved system and method that updates the behavior model for a vehicle control module whenever there is a take-over event to allow the system to learn the tendencies of a particular driver.

SUMMARY

According to several aspects, of the present disclosure, a method of monitoring a driver in an autonomous vehicle includes monitoring, with a driver monitoring system, a driver of a vehicle, collecting, with a data processor, data from the driver monitoring system related to gaze behavior of the driver, classifying, with the data processor, the driver as one of a plurality of driver statuses based on the data from the driver monitoring system, and sending, with the data processor, instructions to at least one vehicle system based on the classification of the driver.

According to another aspect, classifying the driver with one of the plurality of driver statuses based on the data from the driver monitoring system further includes creating an actual gaze model based on the data collected by the driver monitoring system, classifying the actual gaze model with one of a plurality of pre-defined gaze models, and classifying the driver with one of the plurality of driver statuses based on the classification of the actual gaze model and a vehicle operation status of the vehicle.

According to another aspect, the plurality of driver statuses includes a first driver status, a second driver status, and a third driver status, and the plurality of pre-defined gaze models includes a first gaze model, a second gaze model, and a third gaze model.

According to another aspect, classifying the driver with one of the plurality of driver statuses based on the classification of the actual gaze model and a vehicle operation status of the vehicle further includes classifying the driver with the first driver status when the actual gaze model is classified as the first pre-defined gaze model and the vehicle operation status is manual mode, and classifying the driver with the second driver status when the actual gaze model is classified as the first pre-defined gaze model and the vehicle operation status is autonomous mode.

According to another aspect, classifying the driver with one of the plurality of driver statuses based on the classification of the actual gaze model and a vehicle operation status of the vehicle further includes classifying the driver with the third driver status when the actual gaze model is classified as the second pre-defined gaze model and the vehicle operation status is manual mode, classifying the driver with the first driver status when the actual gaze model is classified as the second pre-defined gaze model, the vehicle operation status is autonomous mode, and the vehicle is one of a level one autonomous vehicle and a level two autonomous vehicle, and classifying the driver with the second driver status when the actual gaze model is classified as the second pre-defined gaze model, the vehicle operation status is autonomous mode, and the vehicle is one of a level three autonomous vehicle, a level four autonomous vehicle, and a level five autonomous vehicle.

According to another aspect, classifying the driver with one of the plurality of driver statuses based on the classification of the actual gaze model and a vehicle operation status of the vehicle further includes classifying the driver with the third driver status when the actual gaze model is classified as the third pre-defined gaze model and the vehicle operation status is manual mode, classifying the driver with the third driver status when the actual gaze model is classified as the third pre-defined gaze model, the vehicle operation status is autonomous mode, and the vehicle is one of a level one autonomous vehicle and a level two autonomous vehicle, and classifying the driver with the first driver status when the actual gaze model is classified as the third pre-defined gaze model, the vehicle operation status is autonomous mode, and the vehicle is one of a level three autonomous vehicle, a level four autonomous vehicle, and a level five autonomous vehicle.

According to another aspect, the sending, with the data processor, instructions to at least one vehicle system based on the classification of the driver further includes sending, with the data processor, instructions to a vehicle control module to maintain current operating parameters of the vehicle when the driver of the vehicle is classified with the first driver status.

According to another aspect, the sending, with the data processor, instructions to at least one vehicle system based on the classification of the driver further includes sending, with the data processor, instructions to the vehicle control module to alter the current operating parameters of the vehicle when the driver of the vehicle is classified with one of the second driver status and the third driver status.

According to another aspect, the second driver status is indicative that the driver of the vehicle is uncomfortable and likely to take over manual control of the vehicle, and instructions sent to the vehicle control module are adapted to alter the current operating parameters of the vehicle to make the driver of the vehicle comfortable and reduce the likelihood that the driver of the vehicle will take over manual control.

According to another aspect, the third driver status is indicative that the driver of the vehicle is distracted, and instructions sent to the vehicle control module are adapted to alter the priority of warning that may be provided to the driver.

According to another aspect, the method further includes updating the plurality of pre-defined gaze models.

According to another aspect, classifying the actual gaze model with one of a plurality of pre-defined gaze models further includes generating, with the data processor, a confidence score of the classification of the actual gaze model.

According to several aspects of the present disclosure, a system for monitoring a driver in an autonomous vehicle includes a driver monitoring system adapted to collect data related to gaze behavior of the driver, a data processor adapted to receive data from the driver monitoring system and to classify the driver with one of a first driver status, a second driver status and a third driver status based on the data from the driver monitoring system, and at least one vehicle system, the data processor further adapted to send instructions to the at least one vehicle system based on the classification of the driver.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
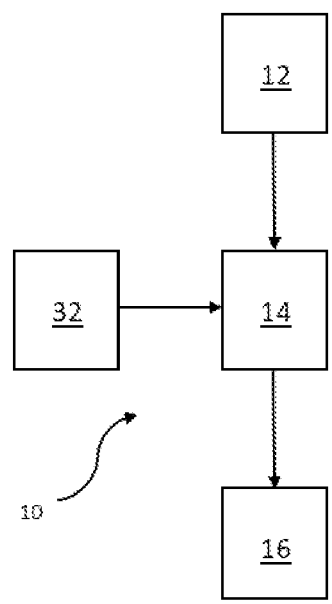
FIG. 1 is a schematic diagram of a system for monitoring a driver of an autonomous vehicle according to an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module or controller refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Referring to FIG. 1, a system 10 for monitoring a driver in an autonomous vehicle includes a driver monitoring system 12 that is adapted to collect data related to gaze behavior of the driver and a data processor 14 that is in communication with the driver monitoring system 12 and is adapted to receive data from the driver monitoring system 12. The data processor 14 is further adapted to classify the driver with one of a plurality of driver statuses based on the data received from the driver monitoring system 12. The system 10 further includes at least one vehicle system 16, such as a vehicle control module, and the data processor 14 is further adapted to send instructions to the at least one vehicle system 16 based on the classification of the driver.

The data processor 14 is a non-generalized, electronic control device having a preprogrammed digital computer or processor, memory or non-transitory computer readable medium used to store data such as control logic, software applications, instructions, computer code, data, lookup tables, etc., and a transceiver or input/output ports. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

When classifying the driver with one of the plurality of driver statuses based on the data from the driver monitoring system 12, the data processor 14 is further adapted to create an actual gaze model 18 based on the data collected by the driver monitoring system 12, classify the actual gaze model 18 with one of a first pre-defined gaze model 20, a second pre-defined gaze model 22 and a third pre-defined gaze model 24, generate a confidence score of the classification of the actual gaze model 18, and classify the driver with one of the first driver status, the second driver status and the third driver status based on the classification of the actual gaze model 18 and a vehicle operation status of the vehicle. It should be understood by those skilled in the art that the system 10 may classify the actual gaze model 18 with one of any suitable number of pre-defined gaze models.

The actual gaze model 18 is a probability distribution of the observed gaze behavior of the driver of the vehicle. In an exemplary embodiment, the actual gaze model 18 is based on normalized neural network outputs. In one exemplary embodiment, the first pre-defined gaze model 20 is a probability distribution of gaze behaviors that indicate the driver of the vehicle is paying close attention similarly to when the driver is manually driving the vehicle. The first pre-defined gaze model 20 is called a "Driving" gaze model.

The second pre-defined gaze model 22 is a probability distribution of gaze behaviors that indicate the driver of the vehicle is paying attention, but not closely, such as when the vehicle is in lower level of autonomous mode (i.e., level 1, 2), and the driver is only giving rudimentary attention to the driving characteristics of the vehicle. The second pre-defined gaze model 22 is called a "Supervision" gaze model.

The third pre-defined gaze model 24 is a probability distribution of gaze behaviors the indicate the driver of the vehicle is not paying attention at all. The third pre-defined gaze model 24 is called a "Wandering" gaze model. It should be understood that there could be any suitable number of pre-defined gaze models and the exemplary embodiment described herein is meant to illustrate a non-limiting example.

Figure 2:
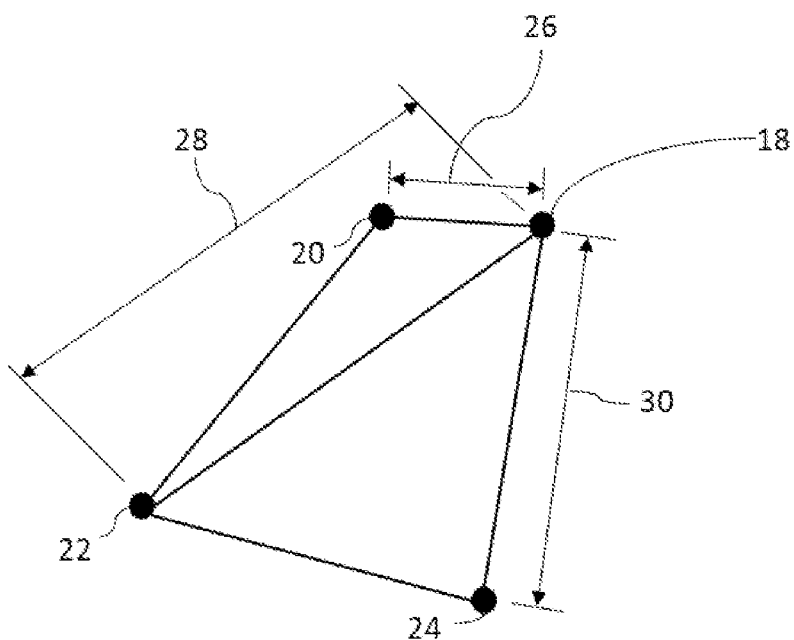
FIG. 2 is a schematic view of a two-dimensional representation of an actual gaze distribution model being compared to a plurality of pre-defined gaze distribution models.

The data processor 14 is adapted to classify the actual gaze model 18 with one of the first pre-defined gaze model 20, the second pre-defined gaze model 22 and the third pre-defined gaze model 24 by matching the actual gaze model 18 to one of the first, second, and third pre-defined gaze models 20, 22, 24. Using a neural network loss function, the actual gaze model 18 is compared to the first, second and third pre-defined gaze models 20, 22, 24, and the actual gaze model 18 is classified as the one of the first, second and third pre-defined gaze models 20, 22, 24 that most closely matches. FIG. 2, is a two-dimensional representation of an actual gaze model distribution 18, a Driving gaze model distribution 20, a Supervision gaze model distribution 22 and a Wandering gaze model distribution 24.

Figure 3:
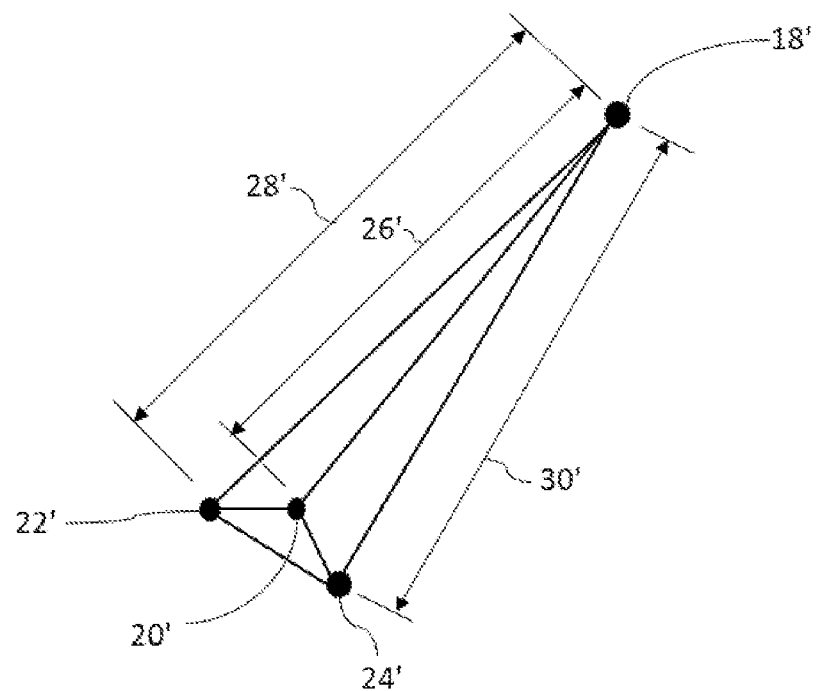
FIG. 3 is a schematic view of an alternate two-dimensional representation of an actual gaze distribution model being compared to a plurality of pre-defined gaze distribution models.

The data processor 14 generates a confidence score of the classification of the actual gaze model 18 by comparing how much more closely the actual gaze model 18 matches one of the first, second, and third pre-defined gaze models 20, 22, 24 compared to the others. In the example shown in FIG. 2, the actual gaze model 18 is matched to the first pre-defined gaze model 20, or the Driving gaze model distribution 20. This is because the 2-dimensional distance 26 between the actual gaze model 18 and the Driving gaze model distribution 20 is less than the distance 28 between the actual gaze model 18 and the Supervision gaze model distribution 22, and the distance 30 between the actual gaze model 18 and the Wandering gaze model distribution 24, indicating that the actual gaze model 18 most closely matches the first pre-defined or Driving gaze model distribution. The 2-dimensional distance 26 between the actual gaze model 18 and the driving gaze model distribution 20 is significantly less than the distance 28 between the actual gaze model 18 and the Supervision gaze model distribution 22, and the distance 30 between the actual gaze model 18 and the Wandering gaze model distribution 24. Since the difference in the distances 26, 28, 30 is significant, the difficulty of making the final decision regarding the gaze model classification is low. Referring to FIG. 3, the 2-dimensional distance 26' between the actual gaze model 18' and the Driving gaze model distribution 20' is less than the distance 28' between the actual gaze model 18' and the Supervision gaze model distribution 22', and the distance 30' between the actual gaze model 18' and the Wandering gaze model distribution 24'. However, in this example, the difference between the distances 26, 28, 30 is not as significant, and consequently, the difficulty of making the final decision regarding the gaze model classification is high.

The data processor is adapted to classify the driver with one of the first driver status, the second driver status and the third driver status. In an exemplary embodiment, the first driver status is indicative that the driver is comfortable, paying appropriate attention, and unlikely to take over manual control of the vehicle. The second driver status is indicative that the driver is uncomfortable, and more likely to take over manual control of the vehicle. The third driver status is indicative that the driver is inattentive or distracted.

In an exemplary embodiment, the plurality of driver statuses includes a first driver status, a second driver status and a third driver status. It should be understood that the system 10 could include any number of driver statuses without departing from the scope of the present disclosure. When classifying the driver with one of the first driver status, the second driver status and the third driver status based on the classification of the actual gaze model 18 and a vehicle operation status of the vehicle, the data processor 14 is further adapted to classify the driver with the first driver status when the actual gaze model 18 is classified as the first pre-defined gaze model 20 and the vehicle operation status is manual mode.

The data processor 14 is in communication with a vehicle CAN BUS 32, whereby the data processor 14 receives information on the vehicle operation status. Primarily, the data processor determines if the vehicle is in autonomous or manual mode. When the actual gaze model 18 is classified as the first pre-defined gaze model 20 the driver is paying close attention, and, since the vehicle is in manual mode, that is how the driver should be behaving. Therefore, the data processor is adapted to send instructions to the vehicle control module 16 to maintain current operating parameters of the vehicle.

When classifying the driver with one of the first driver status, the second driver status and the third driver status based on the classification of the actual gaze model 18 and a vehicle operation status of the vehicle, the data processor 14 is further adapted to classify the driver with the second driver status when the actual gaze model 18 is classified as the first pre-defined gaze model 20 and the vehicle operation status is autonomous mode.

When the actual gaze model 18 is classified as the first pre-defined gaze model 20 the driver is paying close attention, but, since the vehicle is in autonomous mode, this indicates the driver is uncomfortable and is likely to take over manual control of the vehicle.

For example, if a vehicle is operating in autonomous mode, and the vehicle control module 16 is following a vehicle immediately ahead at a one second headway, and the driver exhibits glance behavior that results in the system classifying the driver with the second driver status, the data processor will send instructions to the vehicle control module 16 to increase the headway to two seconds. This may result in the driver behaving differently, and the system 10 classifying the driver with the first driver status, wherein, the vehicle control module 16 will take no further action. Alternately, the driver of the vehicle may still exhibit behavior that keeps the driver classified with the second driver status, wherein the data processor 14 will send additional instruction to the vehicle control module 16 to alter the current operating parameters, such as by slowing down, changing lanes, etc.

When classifying the driver with one of the first driver status, the second driver status and the third driver status based on the classification of the actual gaze model 18 and a vehicle operation status of the vehicle, the data processor 14 is further adapted to classify the driver with the third driver status when the actual gaze model 18 is classified as the second pre-defined gaze model and the vehicle operation status is manual mode.

When the actual gaze model 18 is classified as the second pre-defined gaze model 22 the driver is paying less close attention, and, since the vehicle is in manual mode, this indicates the driver is distracted or inattentive. Therefore, when the driver of the vehicle is classified with the third driver status the data processor 14 is adapted to send instructions to the vehicle control module 16 to alter the priority of the warning prompts (e.g., issue attention alert when it is appropriate, provide enhance take-over alert).

When classifying the driver with one of the first driver status, the second driver status and the third driver status based on the classification of the actual gaze model 18 and a vehicle operation status of the vehicle, the data processor 14 is further adapted to classify the driver with the first driver status when the actual gaze model is classified as the second pre-defined gaze model, the vehicle operation status is autonomous mode, and the vehicle is one of a level one autonomous vehicle and a level two autonomous vehicle.

When the actual gaze model 18 is classified as the second pre-defined gaze model 22 the driver is paying less close attention, but, since the vehicle is in autonomous mode and is one of a level one or level two autonomous vehicle, this behavior by the driver is ok. A level one or two autonomous vehicle requires such a level of attention by the driver, therefore, the data processor 14 is adapted to send instructions to the vehicle control module 16 to maintain current operating parameters of the vehicle.

When classifying the driver with one of the first driver status, the second driver status and the third driver status based on the classification of the actual gaze model 18 and a vehicle operation status of the vehicle, the data processor 14 is further adapted to classify the driver with the second driver status when the actual gaze model is classified as the second pre-defined gaze model, the vehicle operation status is autonomous mode, and the vehicle is one of a level three autonomous vehicle, a level four autonomous vehicle, and a level five autonomous vehicle.

When the actual gaze model 18 is classified as the second pre-defined gaze model 22 the driver is paying less close attention, and, since the vehicle is in autonomous mode and is one of a level three, four or five autonomous vehicle, this indicates the driver is uncomfortable and is likely to take over manual control of the vehicle. A level three, four or five autonomous vehicle would not normally require that level of attention from the driver. Therefore, the data processor 14 is adapted to send instructions to the vehicle control module 16 to alter the current operating parameters of the vehicle to make the driver more comfortable and reduce the likelihood that the driver will take over manual control of the vehicle.

When classifying the driver with one of the first driver status, the second driver status and the third driver status based on the classification of the actual gaze model and a vehicle operation status of the vehicle, the data processor is further adapted to classify the driver with the third driver status when the actual gaze model is classified as the third pre-defined gaze model and the vehicle operation status is manual mode.

When the actual gaze model 18 is classified as the third pre-defined gaze model 24 the driver is not paying attention, and, since the vehicle is in manual mode, this indicates the driver is distracted or inattentive. Therefore, when the driver of the vehicle is classified with the third driver status the data processor 14 is adapted to send instructions to the vehicle control module 16 to alter the current operating parameters of the vehicle to alter the ability of the driver to take over manual control of the vehicle, by preventing the driver from taking over manual control when the driver is distracted.

When classifying the driver with one of the first driver status, the second driver status and the third driver status based on the classification of the actual gaze model and a vehicle operation status of the vehicle, the data processor is further adapted to classify the driver with the third driver status when the actual gaze model is classified as the third pre-defined gaze model, the vehicle operation status is autonomous mode, and the vehicle is one of a level one autonomous vehicle and a level two autonomous vehicle.

When the actual gaze model 18 is classified as the third pre-defined gaze model 24 the driver is not paying attention, and, since the vehicle is in autonomous mode and the vehicle is a level one or level two autonomous vehicle, this indicates the driver is distracted or inattentive. A level one or level two autonomous vehicle requires more attention than this from the driver. Therefore, when the driver of the vehicle is classified with the third driver status the data processor 14 is adapted to send instructions to the vehicle control module 16 to alter the current operating parameters of the vehicle to alter the ability of the driver to take over manual control of the vehicle, by preventing the driver from taking over manual control when the driver is distracted.

When classifying the driver with one of the first driver status, the second driver status and the third driver status based on the classification of the actual gaze model and a vehicle operation status of the vehicle, the data processor is further adapted to classify the driver with the first driver status when the actual gaze model is classified as the third pre-defined gaze model, the vehicle operation status is autonomous mode, and the vehicle is one of a level three autonomous vehicle, a level four autonomous vehicle, and a level five autonomous vehicle.

When the actual gaze model 18 is classified as the third pre-defined gaze model 24 the driver is not paying attention, but, since the vehicle is in autonomous mode and the vehicle is a level three, four or five autonomous vehicle, this level of attention by the driver is ok. A level three, four or five autonomous vehicle requires no attention from the driver. Therefore, the data processor 14 is adapted to send instructions to the vehicle control module 16 to maintain the current operating parameters of the vehicle.

Finally, the data processor is adapted to update the first pre-defined gaze model 20, the second pre-defined gaze model 22 and the third pre-defined gaze model 24. In this way, the system 10 continuously learns the behaviors and preferences of the driver to better predict the driver status in the future.

Figure 4:
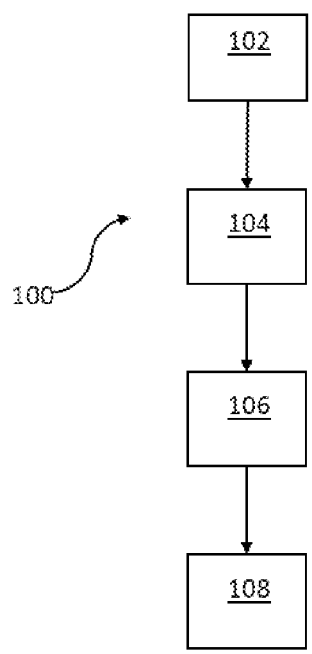
FIG. 4 is a flow chart illustrating a method in accordance with an exemplary embodiment of the present disclosure.

Referring to FIG. 4, a method 100 of monitoring a driver in an autonomous vehicle, includes, starting at block 102, monitoring, with a driver monitoring system, a driver of a vehicle, moving to block 104, and collecting, with a data processor, data from the driver monitoring system related to gaze behavior of the driver. Moving to block 106, the method further includes classifying, with the data processor, the driver as one of a plurality of driver statuses based on the data from the driver monitoring system, and, moving to block 108, sending, with the data processor, instructions to at least one vehicle system based on the classification of the driver.

Figure 5:
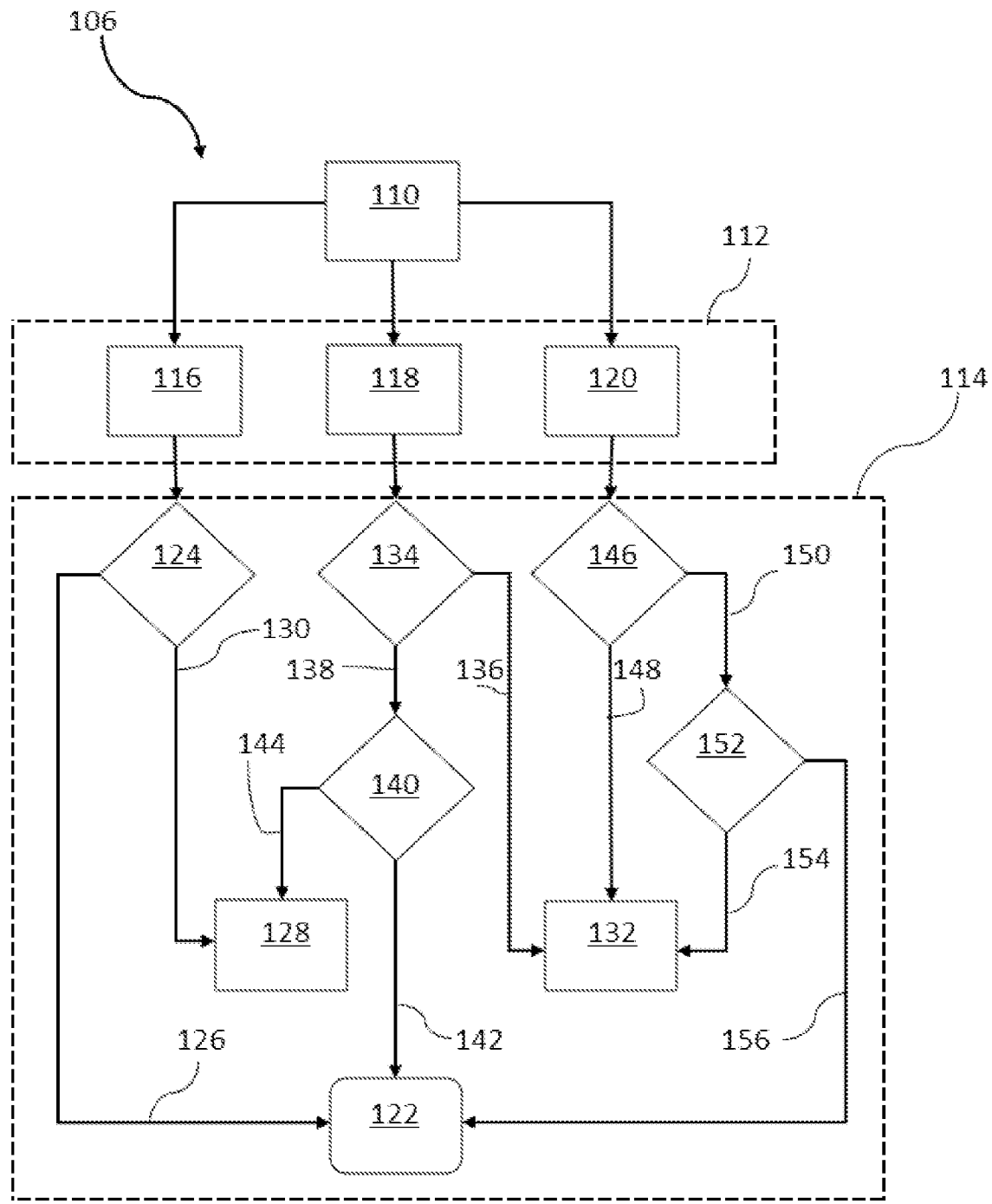
FIG. 5 is a flow chart illustrating details of block 106 from FIG. 4.

Referring to FIG. 5, in an exemplary embodiment, the classifying the driver with one of the plurality of driver statuses based on the data from the driver monitoring system 12 at block 106 further includes, moving to block 110, creating an actual gaze model 18 based on the data collected by the driver monitoring system 12, and, moving to block 112, classifying the actual gaze model with one of a plurality of pre-defined gaze models 20, 22, 24, and, moving to block 114, classifying the driver with one of the plurality of driver statuses based on the classification of the actual gaze model 18 and a vehicle operation status of the vehicle.

In an exemplary embodiment, the classifying the actual gaze model with one of a plurality of pre-defined gaze models 20, 22, 24 at block 112 further includes generating, with the data processor 14, a confidence score of the classification of the actual gaze model 18.

The plurality of driver statuses includes a first driver status, a second driver status, and a third driver status, and the plurality of pre-defined gaze models includes a first gaze model, a second gaze model, and a third gaze model. At block 112, the classifying the actual gaze model 18 with one of a plurality of pre-defined gaze models 20, 22, 24, further includes one of, moving to block 116, classifying the actual gaze model 18 with the first pre-defined gaze model 20, or, moving to block 118, classifying the actual gaze model with the second pre-defined gaze model 22, or, moving to block 120, classifying the actual gaze model 18 with the third pre-defined gaze model 24.

In an exemplary embodiment, the classifying the driver with one of the plurality of driver statuses based on the classification of the actual gaze model and a vehicle operation status of the vehicle at block 114 further includes, moving to block 122, classifying the driver with the first driver status when the actual gaze model 18 is classified as the first pre-defined gaze model at block 116, and the vehicle operation status is manual mode, as indicated by arrow 126 at block 124; and moving to block 128, classifying the driver with the second driver status when the actual gaze model 18 is classified as the first pre-defined gaze model at block 116, and the vehicle operation status is autonomous mode, as indicated by arrow 130 at block 124.

Further, the classifying the driver with one of the plurality of driver statuses based on the classification of the actual gaze model 18 and a vehicle operation status of the vehicle at block 114 further includes, moving to block 132, classifying the driver with the third driver status when the actual gaze model 18 is classified as the second pre-defined gaze model at block 118, and the vehicle operation status is manual mode, as indicated by arrow 136 at block 134.

The classifying the driver with one of the plurality of driver statuses based on the classification of the actual gaze model 18 and a vehicle operation status of the vehicle at block 114 further includes, moving to block 122 classifying the driver with the first driver status when the actual gaze model 18 is classified as the second pre-defined gaze model at block 118, and the vehicle operation status is autonomous mode, as indicated by arrow 138 at block 134, and the vehicle is one of a level one autonomous vehicle and a level two autonomous vehicle, as indicated by arrow 142 at block 140.

The classifying the driver with one of the plurality of driver statuses based on the classification of the actual gaze model 18 and a vehicle operation status of the vehicle at block 114 further includes, moving to block 128, classifying the driver with the second driver status when the actual gaze model 18 is classified as the second pre-defined gaze model at block 118, and the vehicle operation status is autonomous mode, as indicated by arrow 138 at block 134, and the vehicle is one of a level three autonomous vehicle, a level four autonomous vehicle, and a level five autonomous vehicle, as indicated by arrow 144 at block 140.

Finally, the classifying the driver with one of the plurality of driver statuses based on the classification of the actual gaze model and a vehicle operation status of the vehicle at block 114 further includes, moving to block 132, classifying the driver with the third driver status when the actual gaze model 18 is classified as the third pre-defined gaze model at block 120, and, the vehicle operation status is manual mode, as indicated by arrow 148 at block 146.

The classifying the driver with one of the plurality of driver statuses based on the classification of the actual gaze model and a vehicle operation status of the vehicle at block 114 further includes, moving to block 132, classifying the driver with the third driver status when the actual gaze model 18 is classified as the third pre-defined gaze model at block 120, and, the vehicle operation status is autonomous mode, as indicated by arrow 150 at block 146, and, the vehicle is one of a level one autonomous vehicle and a level two autonomous vehicle, as indicated by arrow 154 at block 152.

The classifying the driver with one of the plurality of driver statuses based on the classification of the actual gaze model and a vehicle operation status of the vehicle at block 114 further includes, moving to block 122, classifying the driver with the first driver status when the actual gaze model 18 is classified as the third pre-defined gaze model at block 120, and, the vehicle operation status is autonomous mode, as indicated by arrow 150 at block 146, and, the vehicle is one of a level three autonomous vehicle, a level four autonomous vehicle, and a level five autonomous vehicle, as indicated by arrow 156 at block 152.

In an exemplary embodiment, the sending, with the data processor 14, instructions to at least one vehicle system 16 based on the classification of the driver at block 108 further includes sending, with the data processor 14, instructions to a vehicle control module 16 to maintain current operating parameters of the vehicle when the driver of the vehicle is classified with the first driver status.

In another exemplary embodiment, the sending, with the data processor 14, instructions to at least one vehicle system 16 based on the classification of the driver at block 108 further includes sending, with the data processor 14, instructions to the vehicle control module 16 to alter the current operating parameters of the vehicle when the driver of the vehicle is classified with one of the second driver status and the third driver status.

The second driver status is indicative that the driver of the vehicle is uncomfortable and likely to take over manual control of the vehicle, and instructions sent to the vehicle control module 16 are adapted to alter the current operating parameters of the vehicle to make the driver of the vehicle comfortable and reduce the likelihood that the driver of the vehicle will take over manual control.

The third driver status is indicative that the driver of the vehicle is distracted, and instructions sent to the vehicle control module 16 are adapted to alter the ability of the driver to take over manual control of the vehicle, by preventing the driver from taking over manual control when the driver is distracted.

In another exemplary embodiment, the method 100 further includes updating the plurality of pre-defined gaze models 20, 22, 24 whenever the driver of the vehicle takes over manual control of the vehicle.

A system 10 and method 100 of the present disclosure offers the advantage of anticipating a take-over event by the driver and allowing the vehicle control module 16 to change the operating parameters of the vehicle or change the priority of the warning prompts to make the driver more comfortable and avoid the take-over event.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of monitoring a driver in an autonomous vehicle, comprising:
   monitoring, with a driver monitoring system, a driver of a vehicle;
   collecting, with a data processor, data from the driver monitoring system related to gaze behavior of the driver;
   classifying, with the data processor, the driver as one of a first driver status, a second driver status, and a third driver status based on the data from the driver monitoring system by:
   creating an actual gaze model based on the data collected by the driver monitoring system;
   classifying the actual gaze model with one of a first gaze model, a second gaze model, and a third gaze model; and
   classifying the driver with one of the first driver status, the second driver status, and the third driver status based on the classification of the actual gaze model and a vehicle operation status of the vehicle by:
   classifying the driver with the third driver status when the actual gaze model is classified as the second pre-defined gaze model and the vehicle operation status is manual mode;
   classifying the driver with the first driver status when the actual gaze model is classified as the second pre-defined gaze model, the vehicle operation status is autonomous mode, and the vehicle is one of a level one autonomous vehicle and a level two autonomous vehicle; and
   classifying the driver with the second driver status when the actual gaze model is classified as the second pre-defined gaze model, the vehicle operation status is autonomous mode, and the vehicle is one of a level three autonomous vehicle, a level four autonomous vehicle, and a level five autonomous vehicle; and
   sending, with the data processor, instructions to at least one vehicle system based on the classification of the driver.

2. The method of claim 1, wherein the classifying the driver with one of the plurality of driver statuses based on the classification of the actual gaze model and a vehicle operation status of the vehicle further includes:
   classifying the driver with the first driver status when the actual gaze model is classified as the first pre-defined gaze model and the vehicle operation status is manual mode; and
   classifying the driver with the second driver status when the actual gaze model is classified as the first pre-defined gaze model and the vehicle operation status is autonomous mode.

3. The method of claim 2, wherein the sending, with the data processor, instructions to at least one vehicle system based on the classification of the driver further includes:
   sending, with the data processor, instructions to a vehicle control module to maintain current operating parameters of the vehicle when the driver of the vehicle is classified with the first driver status.

4. The method of claim 3, wherein the sending, with the data processor, instructions to at least one vehicle system based on the classification of the driver further includes:
   sending, with the data processor, instructions to the vehicle control module to alter the current operating parameters of the vehicle when the driver of the vehicle is classified with one of the second driver status and the third driver status.

5. The method of claim 4, wherein the second driver status is indicative that the driver of the vehicle is uncomfortable and likely to take over manual control of the vehicle, and instructions sent to the vehicle control module are adapted to alter the current operating parameters of the vehicle to make the driver of the vehicle comfortable and reduce the likelihood that the driver of the vehicle will take over manual control.

6. The method of claim 4, wherein the third driver status is indicative that the driver of the vehicle is distracted, and instructions sent to the vehicle control module are adapted to alter the priority of warning prompts that may be provided to the driver.

7. The method of claim 4, further including updating the plurality of pre-defined gaze models whenever the driver of the vehicle takes over manual control of the vehicle.

8. The method of claim 7, wherein classifying the actual gaze model with one of a plurality of pre-defined gaze models further includes generating, with the data processor, a confidence score of the classification of the actual gaze model.

9. A system for monitoring a driver in an autonomous vehicle, comprising:
   a driver monitoring system adapted to collect data related to gaze behavior of the driver;
   a data processor adapted to receive data from the driver monitoring system, create an actual gaze model based on the data collected by the driver monitoring system, classify the actual gaze model with one of a first pre-defined gaze model, a second pre-defined gaze model and a third pre-defined gaze model, generate a confidence score of the classification of the actual gaze model and to classify the driver with one of a first driver status, a second driver status and a third driver status based on the data from the driver monitoring system, wherein when classifying the driver with one of the first driver status, the second driver status and the third driver status based on the classification of the actual gaze model and a vehicle operation status of the vehicle, the data processor is further adapted to:
    classify the driver with a third driver status when the actual gaze model is classified as the second pre-defined gaze model and the vehicle operation status is manual mode;
    classify the driver with the first driver status when the actual gaze model is classified as the second pre-defined gaze model, the vehicle operation status is autonomous mode, and the vehicle is one of a level one autonomous vehicle and a level two autonomous vehicle; and
    classify the driver with the second driver status when the actual gaze model is classified as the second pre-defined gaze model, the vehicle operation status is autonomous mode, and the vehicle is one of a level three autonomous vehicle, a level four autonomous vehicle, and a level five autonomous vehicle; and
    at least one vehicle system, the data processor further adapted to send instructions to the at least one vehicle system based on the classification of the actual gaze model and a vehicle operation status of the vehicle driver.

10. The system of claim 9, wherein when classifying the driver with one of a plurality of driver statuses based on the classification of the actual gaze model and a vehicle operation status of the vehicle, the data processor is further adapted to:
    classify the driver with a first driver status when the actual gaze model is classified as the first pre-defined gaze model and the vehicle operation status is manual mode; and
    classify the driver with a second driver status when the actual gaze model is classified as the first pre-defined gaze model and the vehicle operation status is autonomous mode.

11. The system of claim 10, wherein when classifying the driver with one of a plurality of driver statuses based on the classification of the actual gaze model and a vehicle operation status of the vehicle, the data processor is further adapted to:
    classify the driver with the third driver status when the actual gaze model is classified as the third pre-defined gaze model and the vehicle operation status is manual mode;
    classify the driver with the third driver status when the actual gaze model is classify the driver with the third driver status when the actual gaze model is classified as the third pre-defined gaze model, the vehicle operation status is autonomous mode, and the vehicle is one of a level one autonomous vehicle and a level two autonomous vehicle; and
    classify the driver with the first driver status when the actual gaze model is classified as the third pre-defined gaze model, the vehicle operation status is autonomous mode, and the vehicle is one of a level three autonomous vehicle, a level four autonomous vehicle, and a level five autonomous vehicle.

12. The system of claim 11, further including a vehicle control module, the data processor further adapted to:
    send instructions to the vehicle control module to maintain current operating parameters of the vehicle when the driver of the vehicle is classified with the first driver status; and
    send instructions to the vehicle control module to alter the current operating parameters of the vehicle when the driver of the vehicle is classified with one of the second driver status and the third driver status.

13. The system of claim 12, wherein the second driver status is indicative that the driver of the vehicle is uncomfortable and likely to take over manual control of the vehicle, and the data processor is adapted to send instructions to the vehicle control module to alter the current operating parameters of the vehicle to make the driver of the vehicle comfortable and reduce the likelihood that the driver of the vehicle will take over manual control, and the third driver status is indicative that the driver of the vehicle is distracted, and the data processor is adapted to send instructions to the vehicle control module to alter the priority of warning prompts that may be provided to the driver.

14. The system of claim 13, wherein the data processor is further adapted to update the first pre-defined gaze model, the second pre-defined gaze model and the third pre-defined gaze model whenever the driver of the vehicle takes over manual control of the vehicle.

15. A method of monitoring a driver in an autonomous vehicle, comprising:
    monitoring, with a driver monitoring system, a driver of a vehicle;
    collecting, with a data processor, data from the driver monitoring system related to gaze behavior of the driver;
    classifying, with the data processor, the driver as one of a first driver status, a second driver status, and a third driver status based on the data from the driver monitoring system by:
        creating an actual gaze model based on the data collected by the driver monitoring system;
        classifying the actual gaze model with one of a first gaze model, a second gaze model, and a third gaze model; and
        classifying the driver with one of the first driver status, the second driver status, and the third driver status based on the classification of the actual gaze model and a vehicle operation status of the vehicle by:
            classifying the driver with the third driver status when the actual gaze model is classified as the third pre-defined gaze model and the vehicle operation status is manual mode;
            classifying the driver with the third driver status when the actual classifying the driver with the third driver status when the actual gaze model is classified as the third pre-defined gaze model, the vehicle operation status is autonomous mode, and the vehicle is one of a level one autonomous vehicle and a level two autonomous vehicle; and
            classifying the driver with the first driver status when the actual gaze model is classified as the third pre-defined gaze model, the vehicle operation status is autonomous mode, and the vehicle is one of a level three autonomous vehicle, a level four autonomous vehicle, and a level five autonomous vehicle; and
    sending, with the data processor, instructions to at least one vehicle system based on the classification of the driver.

16. The method of claim 15, wherein the sending, with the data processor, instructions to at least one vehicle system based on the classification of the driver further includes:

sending, with the data processor, instructions to a vehicle control module to maintain current operating parameters of the vehicle when the driver of the vehicle is classified with the first driver status; and sending, with the data processor, instructions to the vehicle control module to alter the current operating parameters of the vehicle when the driver of the vehicle is classified with one of the second driver status and the third driver status.

17. The method of claim 16, wherein the second driver status is indicative that the driver of the vehicle is uncomfortable and likely to take over manual control of the vehicle, and instructions sent to the vehicle control module are adapted to alter the current operating parameters of the vehicle to make the driver of the vehicle comfortable and reduce the likelihood that the driver of the vehicle will take over manual control.

18. The method of claim 16, wherein the third driver status is indicative that the driver of the vehicle is distracted, and instructions sent to the vehicle control module are adapted to alter the priority of warning prompts that may be provided to the driver.

19. The method of claim 16, further including updating the plurality of pre-defined gaze models whenever the driver of the vehicle takes over manual control of the vehicle.

20. The method of claim 19, wherein classifying the actual gaze model with one of a plurality of pre-defined gaze models further includes generating, with the data processor, a confidence score of the classification of the actual gaze model.

* * * * *